United States Patent
Shain et al.

(10) Patent No.: US 7,268,788 B2
(45) Date of Patent: Sep. 11, 2007

(54) ASSOCIATIVE PROCESSING FOR THREE-DIMENSIONAL GRAPHICS

(75) Inventors: Joseph Shain, Tel Aviv (IL); Avidan Akerib, Tel Aviv (IL); Michael Mordison, Netanya (IL); Adi Bar-Lev, Tel Aviv (IL); Nitin Gupta, Kanpur (IN); Nitish Arya, Uttar Pradesh (IN)

(73) Assignee: NeoMagic Israel Ltd., Netanya (IL)

( * ) Notice: Subject to any disclaimer, the term of this patent is extended or adjusted under 35 U.S.C. 154(b) by 244 days.

(21) Appl. No.: 10/932,087

(22) Filed: Sep. 2, 2004

(65) Prior Publication Data
US 2005/0046638 A1    Mar. 3, 2005

(51) Int. Cl.
*G09G 5/00*    (2006.01)
(52) U.S. Cl. ...................................... 345/582
(58) Field of Classification Search .............. 345/545, 345/582, 584, 592, 629, 638
See application file for complete search history.

(56) References Cited

U.S. PATENT DOCUMENTS 5,809,322 A * 9/1998 Akerib ........................ 712/14
6,195,738 B1 * 2/2001 Akerib ........................ 712/12

* cited by examiner

*Primary Examiner*—Matthew C. Bella
*Assistant Examiner*—G. F. Cunningham
(74) *Attorney, Agent, or Firm*—Dekel Patent Ltd.; David Klein

(57) ABSTRACT

Associative processing methods and apparatus are described for processing graphics data for three-dimensional graphic displays, e.g., in three-dimensional games. A texture, which comprises a bitmap image used to apply a design onto the surface of a 3D computer model for 3D graphics display, may be converted to APA (associative processor apparatus) instructions.

18 Claims, 26 Drawing Sheets

- TEXTURES ARE CONVERTED TO APA BASIC INSTRUCTIONS, TO BE PART OF THE PROGRAM CODE.
- ALPHA VALUES ARE ALSO CONVERTED APA BASIC INSTRUCTIONS.
- OVER DRAW COMPUTES INSIDE THE APA — HENCE, NO Z BUFFER IS NEEDED.
- OUTPUT IS NOT WRITTEN TO RANDOM ADDRESSES
  HENCE NO SRAM IS NEEDED FOR DISPLAY.
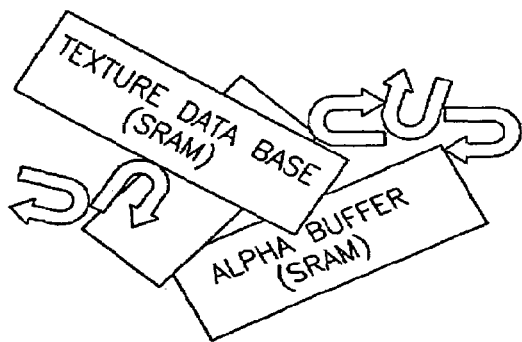
FIG.2

Fig. 3

APA is a caching parallel processor

- Eliminates the Over-Draw problem
- Z storage is not needed anymore
- Random accesses to textures are not needed – the APA generates the textures internally by itself.
- Alfa Blend is done without any access to memory
- For most games, the required memory are the APA code and the display memory. No other memory is needed.

- Implementing the sate of the art 3D functions, without compromising on quality

- BASED ON DIVIDING THE DISPLAY FRAME TO NON — OVERLAPPED TILES. THE PROCESSING RESOURCES (APA AND ARM) CAN WORK INDEPENDENTLY ON DIFFERENT TILES OF THE SAME FRAME OR EVEN DIFFERENT FRAMES.

- BASED ON THE STATE OF THE ART 3D ALGORITHMS.

- THE APA WORKS IN ITS FULL UTILIZATION, AS PARALLEL PROCESSOR AND A SMART CACHING MACHINE.

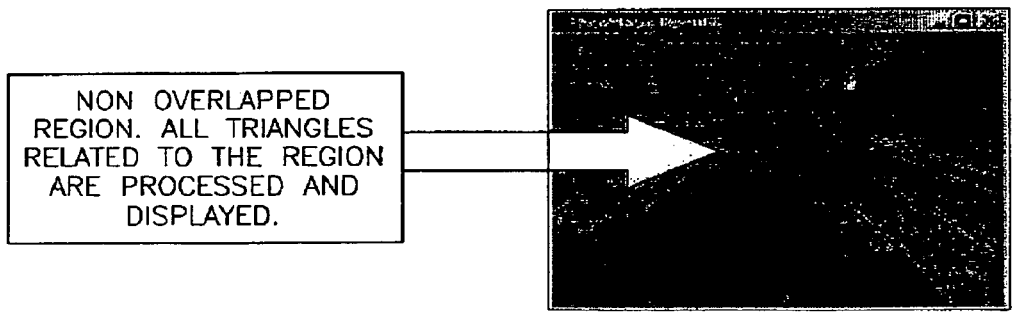

NON OVERLAPPED REGION. ALL TRIANGLES RELATED TO THE REGION ARE PROCESSED AND DISPLAYED.

FIG.4A

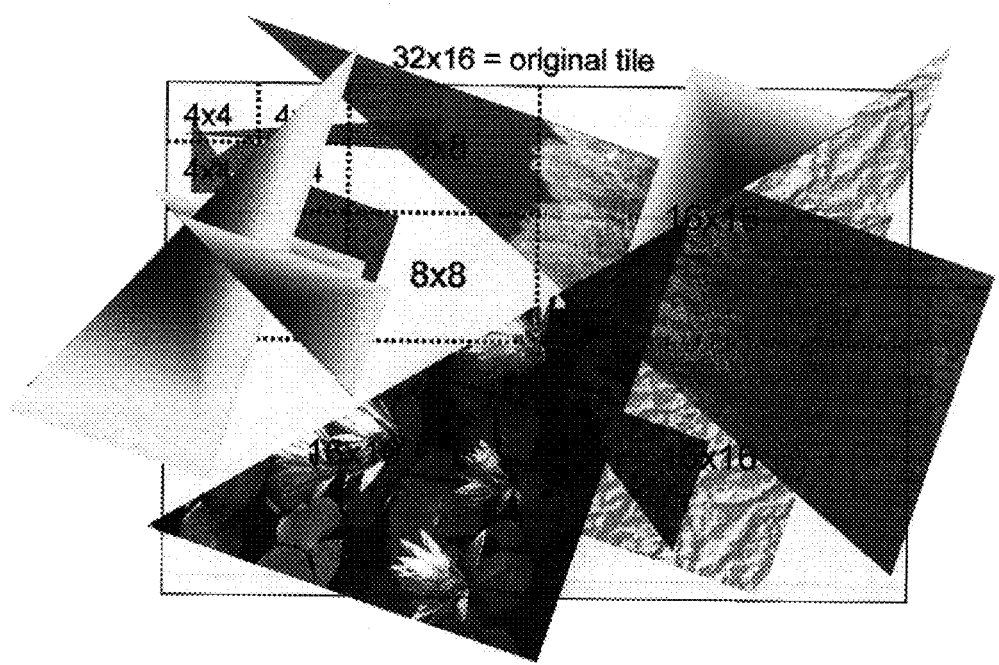

- Divided into 2 parts : Geometry (Triangle based) and Rendering (pixels based)
- Each part is executing on different frame.
- Each frame is divided into a display tile. Tile size is equal to the APA size (ex. = 32x16=512 = APA size, or 64 x 32 =2K APA). In 512 APA there are 150 tiles in Quarter VGA.
- Each tile may divided into additional sub or tiles if the number of triangles is high.

Fig. 6

- Performed geometry transformation and Lighting for the complete frame (T&L)
- Projection
- Divide the frame into tiles of 32x16. Each can subdivide into up to 8 small tiles of 8x8
- For each tile/sub tile
  – Compute the coefficients for all the triangles within a tile, to be processed by the rendering stage $R_p = A_1 X_p + B_1 Y_p + C_1$
$G_p = A_2 X_p + B_2 Y_p + C_2$
$B_p = A_3 X_p + B_3 Y_p + C_3$
$Alpha_p = A_5 X_p + B_5 Y_p + C_5$
$1/Z_p = A_6 X_p + B_6 Y_p + C_6$
$Sp/Zp = A_7 X_p + B_7 Y_p + C_7$
$Tp/Zp = A_8 X_p + B_8 Y_p + C_8$ The value of all the points Xp, Yp which are inside the triangle can be computed in Parallel by using the APA. The ARM solves the equations to generate the A,B,C

Fig. 8

- The Geometry engine (ARM +APA) generates the following coefficients for every triangle in a tile, to be rendered by the APA
  - A,B,C to compute Z value in the APA using the equation :

$1/z = Ax+By+C$ where x and y are the screen coordinates.

- D,E,F,G,H,I to compute the s&t values for the texture coordinates, using the equation:

$s/z = Dx+Ey+F$ and $t/z = Gx +Hy +I$
  - Equations of the three triangle lines ( $x + my = c$)
  - Complete data structure is given below

Fig. 9

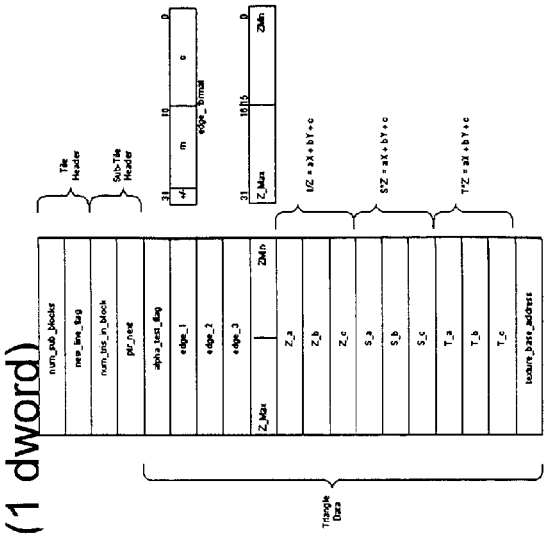

- Tile Header (2 dwords)
  - Number of sub-tiles in this tile
  - new_line_flag (indicates reset x values and increment y values)

- Sub-Tile Header (2 dwords)
  - Number of triangles in this sub-tile (1 dword)
  - Pointer to next sub-tile/ tile header (1 dword)

- Triangle Header (15 dwords)
  - Alpha-test flag (1 dword)
  - m,c for inside/outside (3 dwords)
  - Z_min and Z_max (1 dword)
  - a,b,c for Z (3 dwords)
  - a,b,c for S (3 dwords)
  - a,b,c for T (3 dwords)
  - texture_base_address (1 dword)

The APA computes the final RGB value including alpha blending internally. The FIFO outputs the RGB to the display THE X AND Y COORDINATES ARE THE ACTUAL SCREEN COORDINATES OF THE PROCESSED TILE I.E. THE COORDINATES OF THE FIRST TILE ARE 0-31 FOR X AND 0-15 FOR Y, AND THE LAST TILE, THE COORDINATES ARE 304-319 FOR X AND 224-239 FOR Y. (FOR QVGA = SCREEN SIZE OF 320×240)

APA computes in parallel the Z value for each triangle using the equation $1/Z = Ax + By + C$. Then, the APA resets in parallel all the corresponding hidden bits.

APA computes in parallel the S and T values using the equation
S/Z = Ax +By +C and T/Z = Dx + Ey +F.

Fig. 18

What is a Texture.

- Texture is a small image: 4x4 up to 256x256 pixels. Each pixel is 32 bits, 24 color and 8 bit alpha.
- In a game there are tens to few hundreds different textures.
- There are no more that 256 different colors in a texture.
- APA can built the texture internally without reading it from a random SRAM

Fig. 19

- APA cells are based on Content addressable memory.
- APA can work better on a content, rather on the addresses.
- Hence, instead of representing a texture by an array of pixels, It will be represented by its content. I.e., for every color there will be a list of address containing this color.

Fig. 22

APA is a minterms machine minterms of up to 16 variables are running in one machine cycle for 512 values. Hence multi-parallelism of 16X512 = 8K processors of one bit are working concurrently APA computes in parallel the RGB vales by running the minterms on the S and T values

ASSOCIATIVE PROCESSING FOR THREE-DIMENSIONAL GRAPHICS

FIELD OF THE INVENTION

The present invention relates generally to processing graphics data, and particularly to associative processing graphics data for three-dimensional graphic displays with applications, such as but not limited to, in three-dimensional games.

BACKGROUND OF THE INVENTION

Three-dimensional games for display on personal communication devices, such as but not limited to, cell phones, PDAs and the like, have been developed. The game graphics may be developed with a "Games Developer", such as in a high level studio environment.

Graphics data for three-dimensional games pose a challenge to graphics processing in real time. For example, in interactive games, objects move on the display screen. The movement of the objects changes many parameters in the display, e.g., shading, hidden features, etc. In prior art processors, this can cause a serious problem in the huge I/O requirements used to process the data (see FIG. 1). A large amount of SRAM (static random access memory) is needed and even a good 3D game engine chip is not sufficient to process the data in a tolerable amount of time.

SUMMARY OF THE INVENTION

The present invention seeks to provide novel methods for associative processing of graphics data for three-dimensional graphic displays, as is described more in detail hereinbelow.

There is provided in accordance with an embodiment of the present invention a method including converting a texture, which includes a bitmap image used to apply a design onto the surface of a three-dimensional (3D) computer model for 3D graphics display, to APA (associative processor apparatus) instructions. The method may also include converting values called alpha values, used to define blending effects of the 3D graphics display, to APA instructions. The method may further include performing "over draw", including calculating relative depths of objects of the 3D graphics display for hidden rendering, with the APA.

In accordance with an embodiment of the present invention converting the texture may include dividing data associated with the texture into a geometry part including geometric shapes and a rendering part including pixels of data. Processing the geometry part and the rendering part may be carried out with the APA on different display frames. Processing the geometry part may include, for example, performing a geometry transformation, applying lighting to a display frame that includes the geometry part, and projecting and dividing the display frame into tiles, the tiles including coefficients that define geometric shapes within the tile, the coefficients being used for rendering by the APA. Rendering data associated with the tiles may be carried out, wherein the APA computes final RGB (red-green-blue) values including alpha blending internally in the APA. The RGB values may be calculated by means of minterms and may be outputted to a display.

Further in accordance with an embodiment of the present invention the APA may compute tile coordinates, including X and Y coordinates which are coordinates of the processed tile that are actually seen on a display screen. The associative processing may include inside and outside flags, wherein the inside flag indicates that the X and Y coordinates are inside the geometric shape and outside flag indicates that the X and Y coordinates are outside the geometric shape.

Still further in accordance with an embodiment of the present invention converting the texture may include representing the texture by an address list that contains content features of the texture, and using the APA to process the content features. The address list may be minimized, e.g., with a Karnaugh map.

BRIEF DESCRIPTION OF DRAWINGS

The present invention will be further understood and appreciated from the following detailed description taken in conjunction with the drawing in which:

FIG. 2 is a simplified illustration of converting textures to APA instructions, in accordance with an embodiment of the present invention;

FIG. 3 is a simplified illustration of APA being a caching parallel processor;

FIGS. 4A-4C are simplified illustrations of data flow of the associative processing, based on dividing a display frame into non-overlapped tiles in accordance with an embodiment of the present invention;

FIG. 6 is a simplified illustration of processing geometry in the APA in accordance with an embodiment of the present invention;

FIGS. 7 and 8 are simplified illustrations of triangle representation for parallel computation with the APA in accordance with an embodiment of the present invention;

FIGS. 9 and 10 are simplified illustrations of complete data structure and rendering thereof in accordance with an embodiment of the present invention;

FIGS. 18, 19 and 20 are simplified illustrations of texture generation in the APA, in accordance with an embodiment of the present invention;

FIG. 22 is a simplified illustration of using the APA as a minterms machine, in accordance with an embodiment of the present invention.

DETAILED DESCRIPTION OF DRAWINGS

Reference is now made to FIGS. 2-24, which illustrate a non-limiting example of an embodiment of the present invention.

As seen in FIG. 2, in the present invention, textures may be converted to APA (associative processor array or apparatus) basic instructions, to be part of the program code. Texture is a bitmap image used to apply a design onto the surface of a 3D computer model. Associative processing is a well known technique, described, inter alia, in U.S. Pat. Nos. 5,809,322, 5,974,521, 6,195,738, 6,405,281 and 6,460,127, all to Akerib, the disclosures of which are incorporated herein by reference.

Alpha values, used to define blending effects, for example, may also be converted to APA basic instructions.

Prior art requires "over draw", meaning calculating the relative depths (Z dimension) of objects for proper hidden rendering, a process which is time-consuming and which requires a Z buffer in the prior art. (Rendering in general refers to, but is not limited to, drawing graphics primitives.) In the present invention, over draw is computed inside the APA—hence, no Z buffer is needed.

In the present invention, the output is not written to random addresses—hence low-cost DRAM can be used for the display, instead of costly SRAM.

APA is a caching parallel processor (see FIG. 3). As mentioned before, this eliminates the over-draw problem, and Z storage is no longer needed. Random accesses to textures are not needed—the APA generates the textures internally by itself. Blend with alpha values is done without any access to memory. For most games, the only required memory is the APA code and the display memory. No other memory is needed. In the present invention, state of the art 3D functions may be implemented without compromising on quality.

Figure 1:
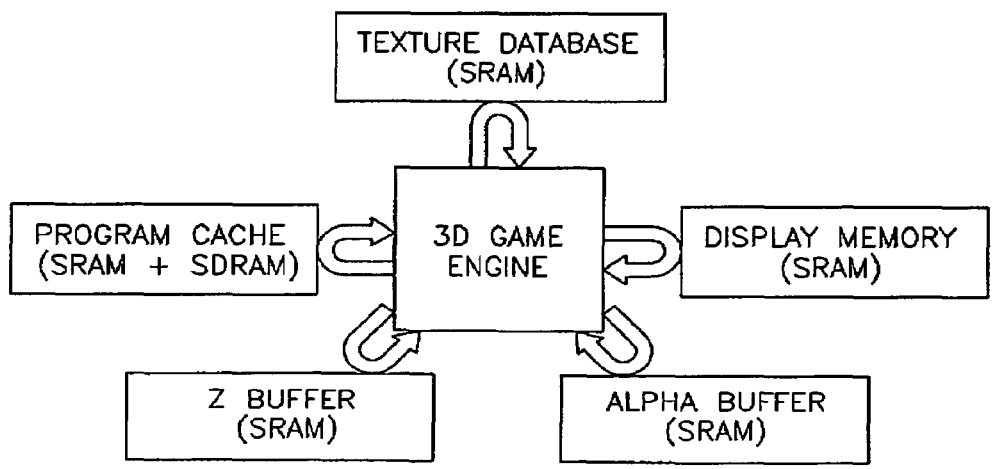
FIG. 1 is a simplified illustration of a prior art graphics display processor.
Figure 4C:
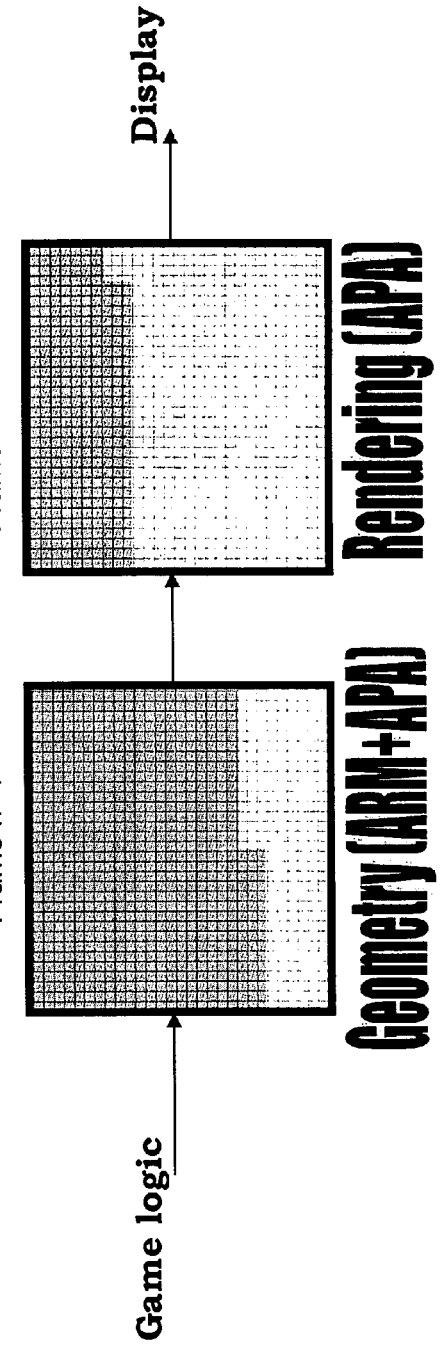

The data flow, which is described with reference to FIGS. 4A-4C, is based on dividing the display frame into non-overlapped tiles. The processing resources, e.g., APA and ARM (Advanced RISC (reduced instruction set computer) Machine), can work independently on different tiles of the same frame or even different frames, and are based on the state of the art 3D algorithms. The APA works in its full utilization as a parallel processor and a smart caching machine.

The display frame may be divided into sub-tiles, as seen in FIG. 4B. The data flow may be divided into two parts: Geometry (Triangle based) and Rendering (pixels based) (see FIG. 4C). Each part may be executed on a different frame. Each frame is divided into a display tile. The tile size may be equal to the APA size (e.g., 32×16=512=APA size, or 64×32=2K APA). In 512 APA there are 150 tiles in a quarter VGA (video graphics array). Each tile may be divided into additional sub-tiles or tiles if the number of triangles is high.

Figure 5:
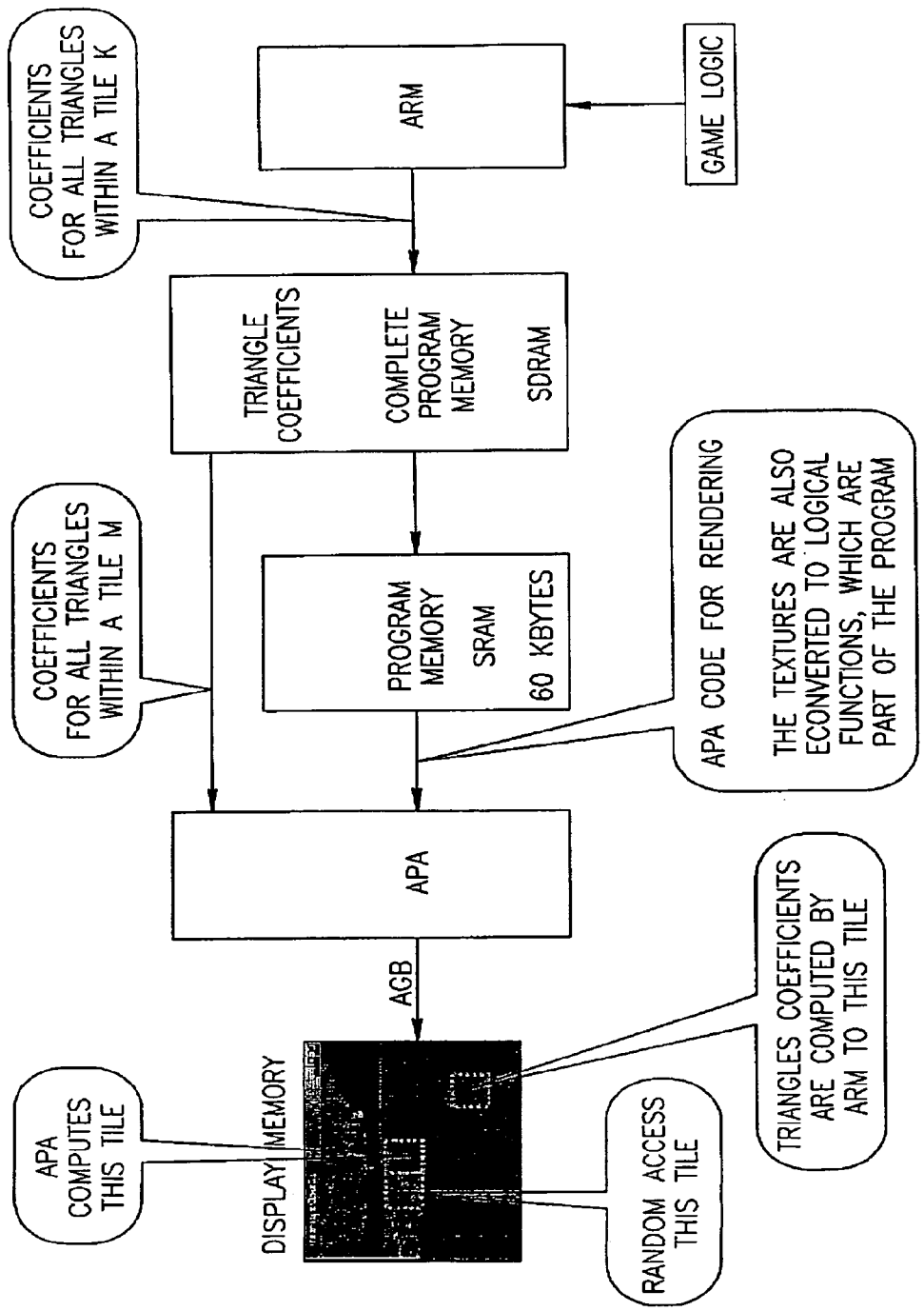
FIG. 5 is a simplified illustration of rendering in the APA in accordance with an embodiment of the present invention.

FIG. 5 shows an example of rendering in APA. Rendering is known in the art of APA, as described, for example, in the patents mentioned above whose disclosures are incorporated by reference.

Processing the geometry (see FIG. 6), may involve geometry transformation and lighting for the complete frame (T&L), projection and dividing the frame into tiles of 32×16 (the invention not being limited to this example). Each tile may be subdivided into up to 8 small tiles of 8×8, for example. For each tile/sub-tile, the system may compute the coefficients for all the triangles within a tile, to be processed by the rendering stage.

Figure 7:
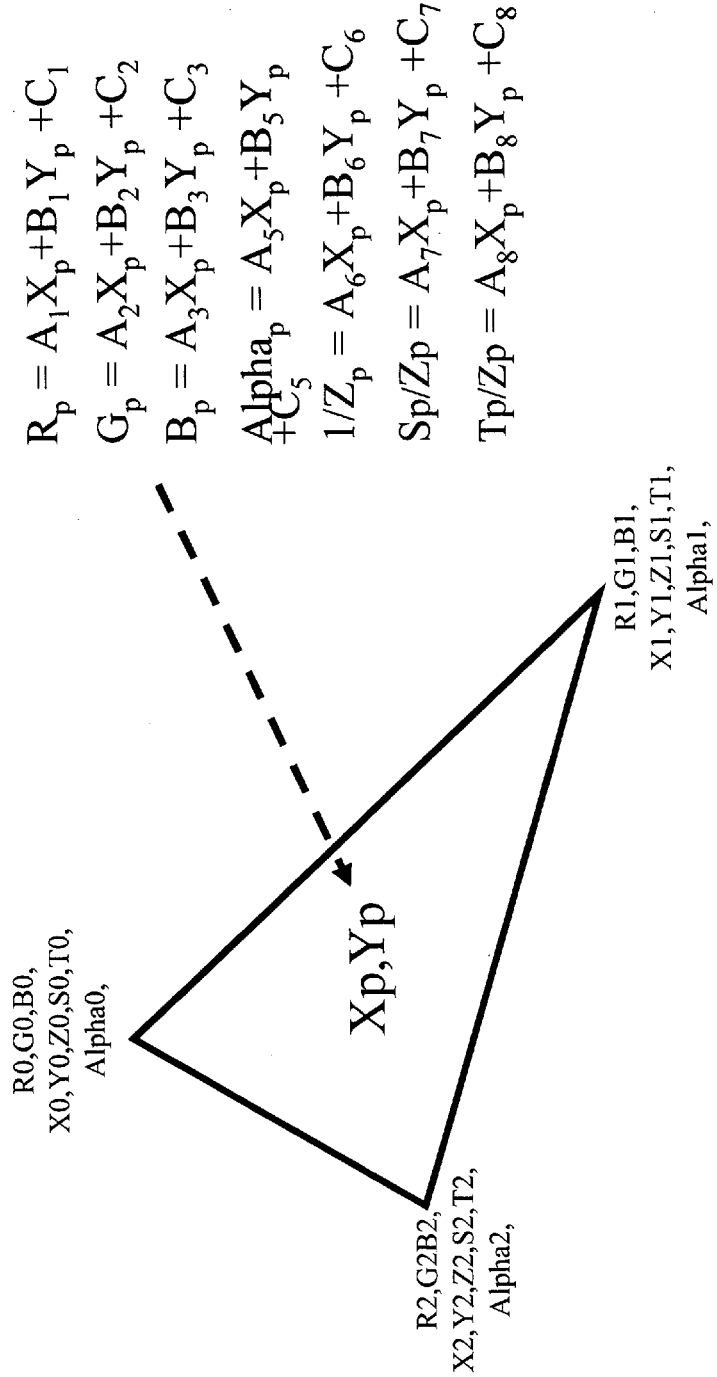

FIGS. 7 and 8 illustrate triangle representation. The value of all the points Xp, Yp which are inside the triangle can be computed in parallel by using the APA. The ARM solves the equations to generate the A, B and C.

For triangle representation in a tile (FIG. 8), the Geometry engine (ARM and APA) may generate coefficients for every triangle in a tile to be rendered by the APA as follows:

1. A, B, C to compute Z value in the APA using the equation:

$1/z = Ax + By + C$ where x and y are the screen coordinates.

2. D, E, F, G, H, I to compute the s&t values for the texture coordinates, using the equation:

$s/z = Dx + Ey + F$ and $t/z = Gx + Hy + I$

3. Equations of the three triangle lines (x+my=c)

Figure 10:
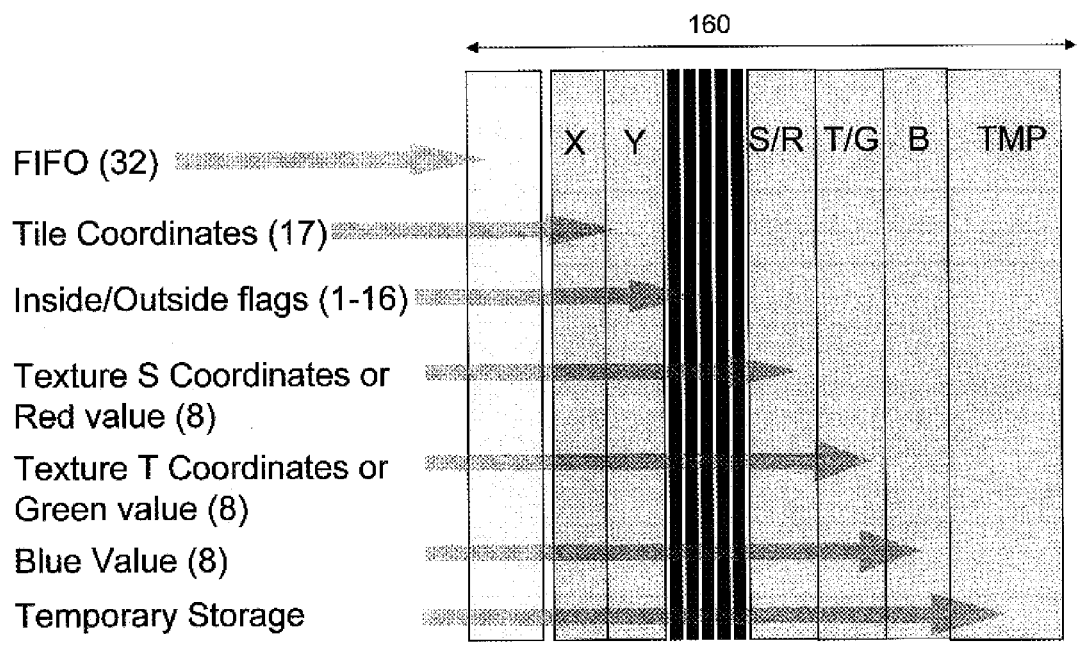
Figure 11:
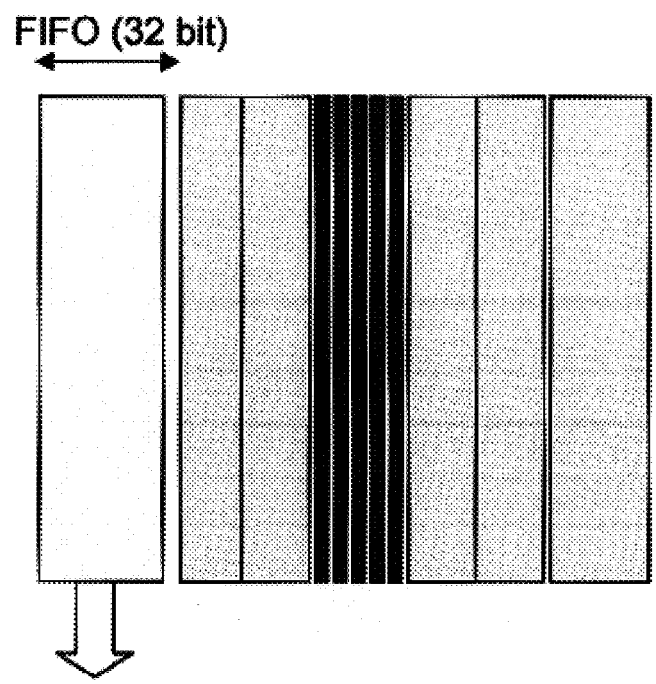
FIG. 11 is a simplified illustration of outputting color information to a display in accordance with an embodiment of the present invention.

Complete data structure and rendering thereof are shown in FIGS. 9 and 10. The tile data structure may comprise the Tile Header, Sub-Tile Header and Triangle Header. In rendering the data structure, the APA computes the final RGB (red-green-blue) value including alpha blending internally. The FIFO outputs the RGB to the display (see FIG. 11).

Figure 12:
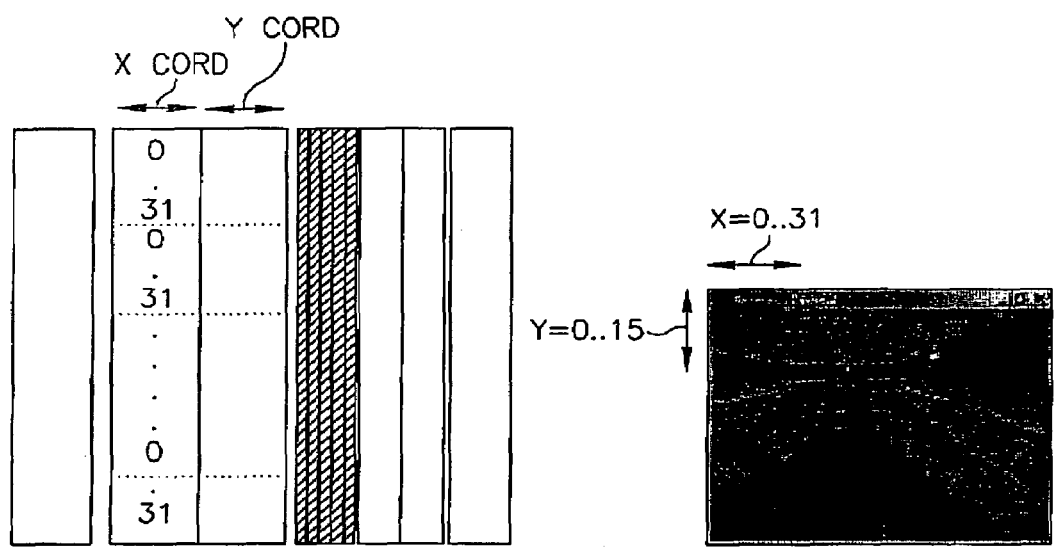
FIG. 12 is a simplified illustration of tile coordinates used in the associative processing, in accordance with an embodiment of the present invention.
Figure 13:
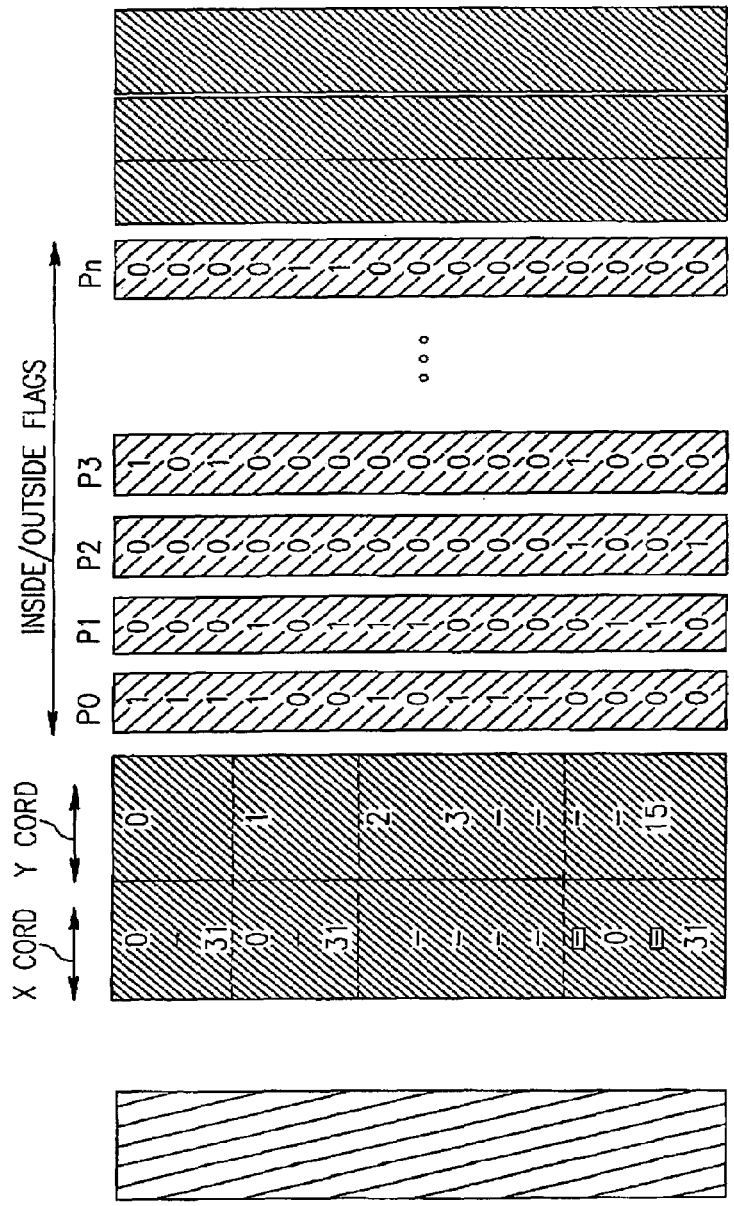
FIGS. 13, 14, 15, 16 and 17 are simplified illustrations of inside and outside flags used in the associative processing, in accordance with an embodiment of the present invention.
Figure 14:
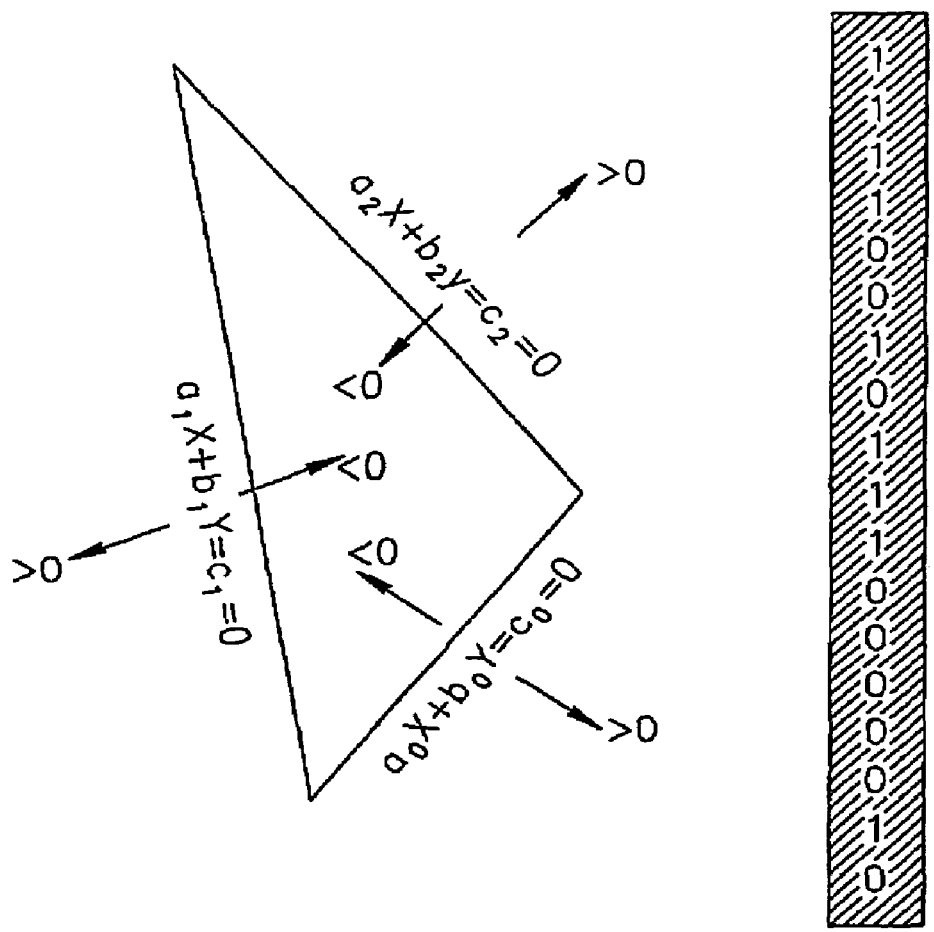
Figure 15:
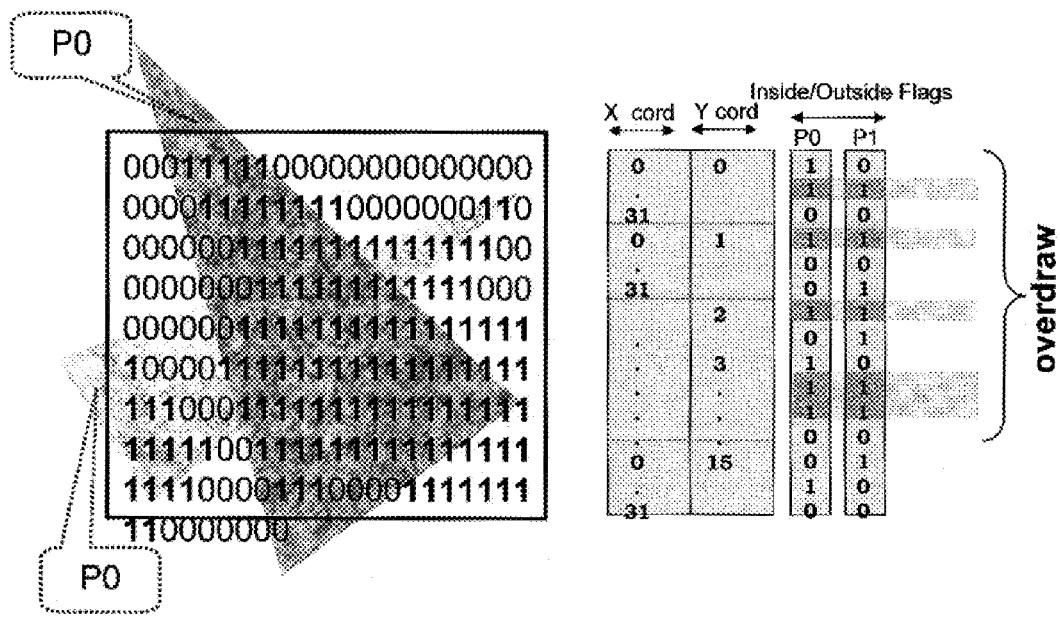
Figure 16:
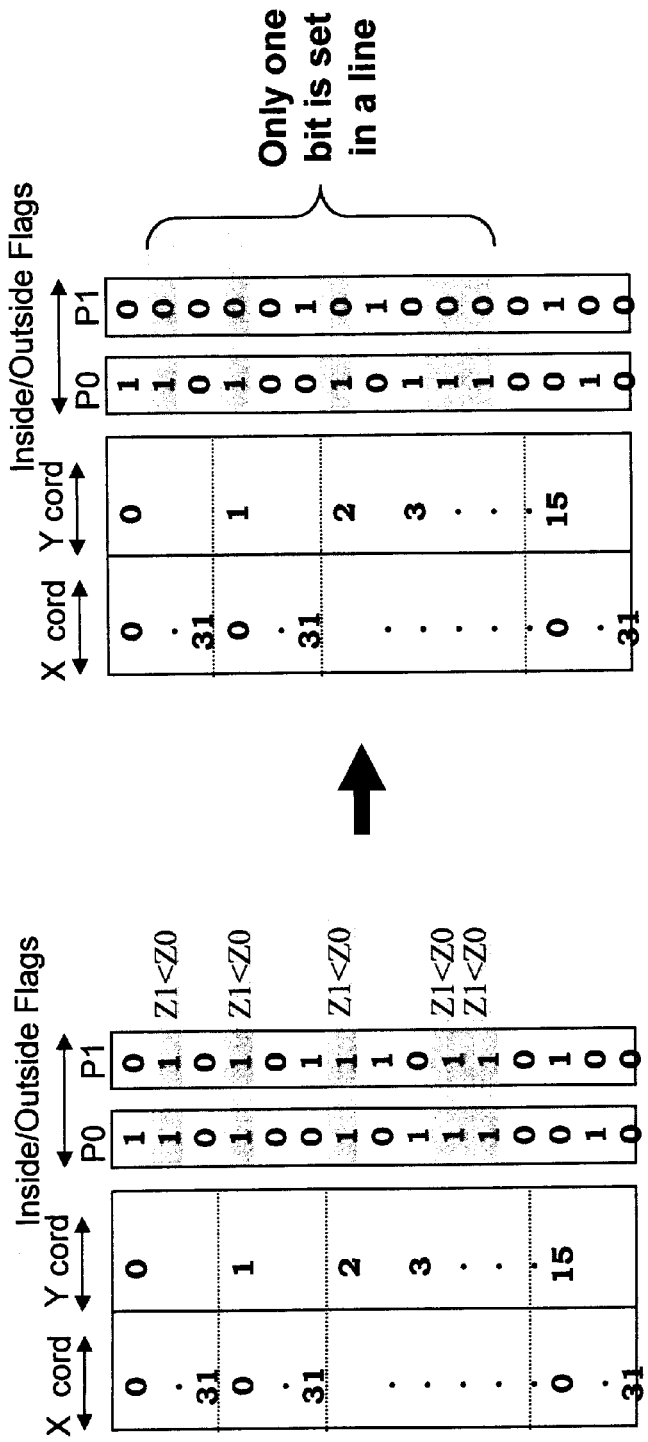
Figure 17:
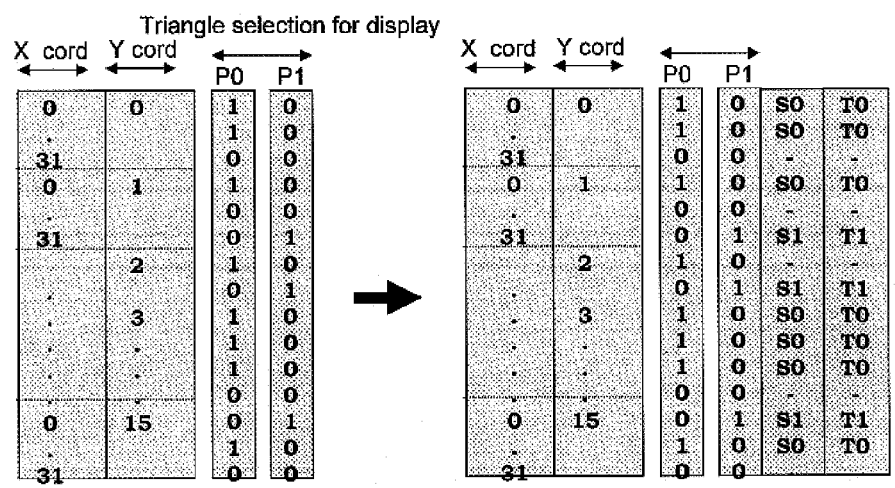

As seen in FIG. 12 (Tile Coordinates), the X and Y coordinates are the actual screen coordinates of the processed tile, i.e. the coordinates of the first tile are 0-31 for X and 0-15 for Y, and for the last tile, the coordinates are 304-319 for X and 224-239 for Y. (For QVGA=screen size of 320×240).

The associative processing involves inside and outside flags (FIGS. 13, 14, 15, 16 and 17). For example, each triangle within a tile represents as a binary flag in the APA. "1" means that the appropriate X, and Y values (screen coordinates) are inside the triangle. In other words the flag Pn represents all the coordinates within a tile that belongs to Triangle Pn.

A, b and c lines parameters are given. The APA computes the sign bit and generates the inside/outside marker in one bit slice for every triangle. The APA computes in parallel the Z value for each triangle using the equation $1/Z = Ax + By + C$. Then, the APA resets in parallel all the corresponding hidden bits.

APA computes in parallel the S and T values using the equation $S/Z = Ax + By + C$ and $T/Z = Dx + Ey + F$.

Figure 20:
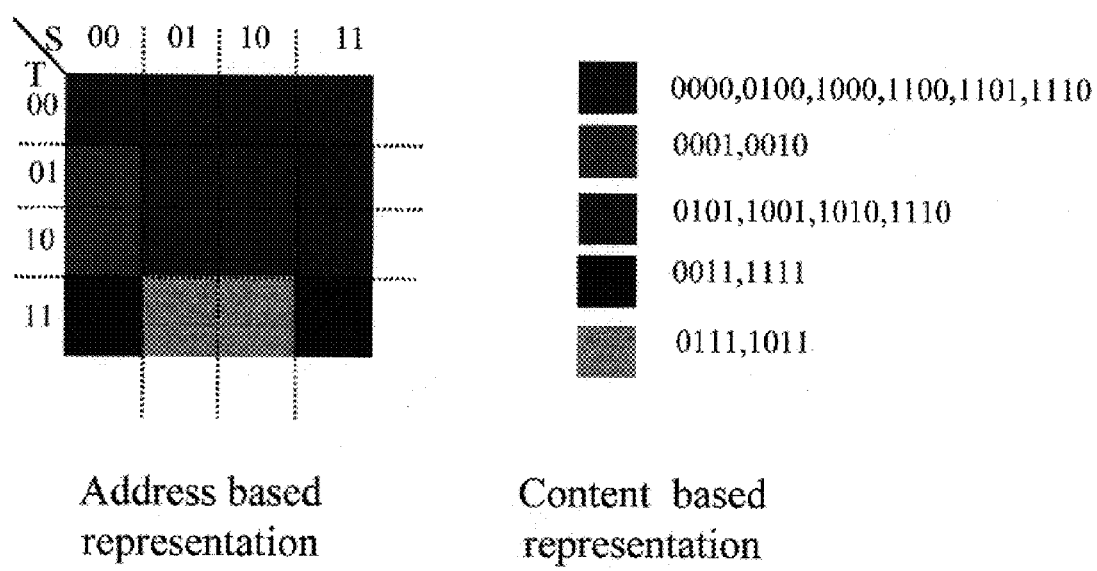

FIGS. 18, 19 and 20 describe an example of texture generation in the APA.

The texture is a small image, e.g., 4×4 up to 256×256 pixels. Each pixel is 32 bits, 24 color and 8 bit alpha, for example. In a game there are tens to few hundreds different textures (the invention not being limited to this example). There are no more that 256 different colors in a texture in this example.

APA can build the texture internally without reading it from a random SRAM. APA cells are based on content addressable memory. APA can work better on content, rather on the addresses. Hence, instead of representing a texture by an array of pixels, the texture may be represented by its content, that is, by content features (e.g., color). For example, for every color there may be a list of address containing this color.

Figure 21:
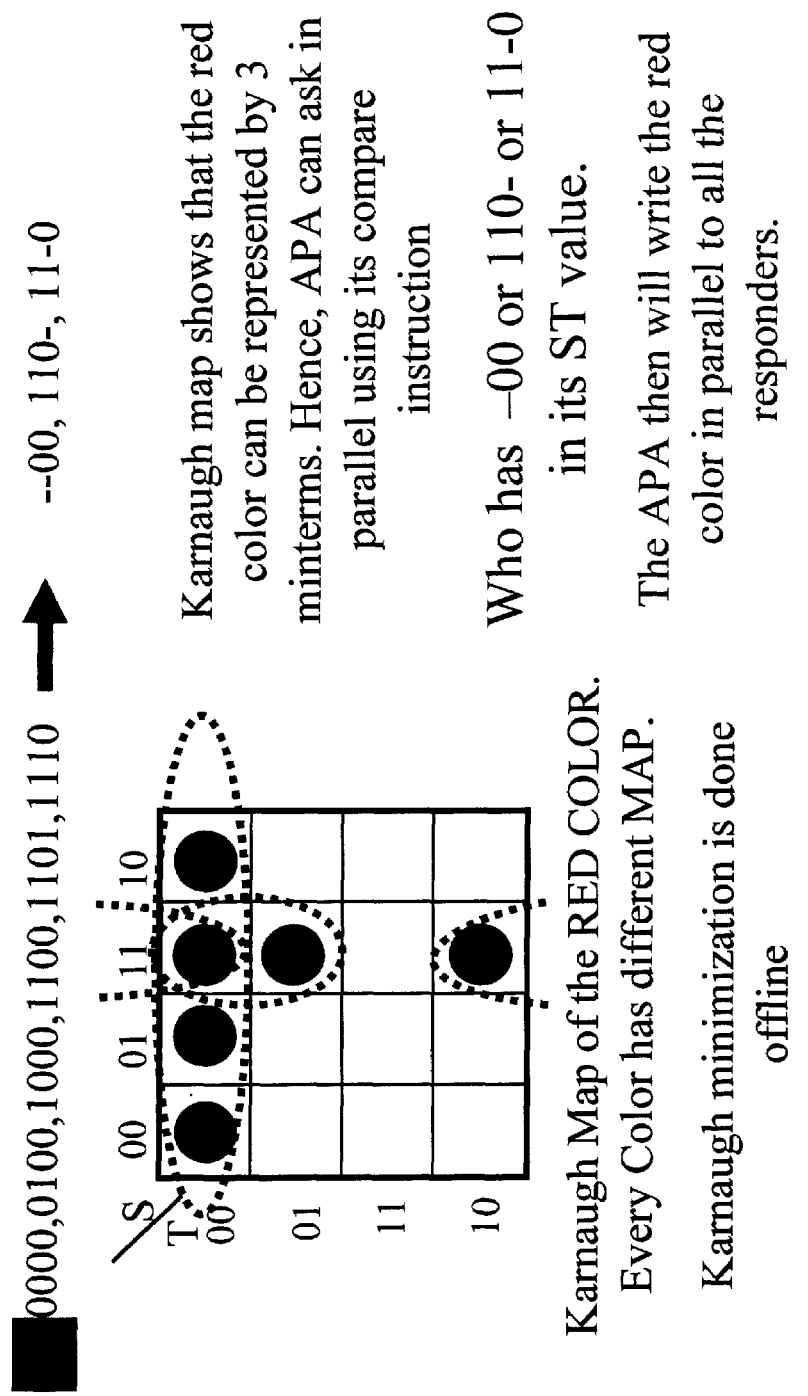
FIG. 21 is a simplified illustration of minimizing an address list used in the APA by using a Karnaugh map, in accordance with an embodiment of the present invention.

The address list may be minimized by various techniques, such as but not limited to, by using a Karnaugh map (FIG. 21).

Texture compression is a technique to compress the representation of texture data such that high decompression speed and local decompression ability is achieved. Further, the decompression algorithm must be simple enough to be implemented in hardware. Known texture compression approaches are based on vector quantization, codebooks, palletizing, look-up tables, etc.

Karnaugh map method is used for minimizing logic expressions resulting in combinational logic designs with a minimum number of gates. For functions of five inputs or less, human based algorithms using Karnaugh maps suffices. On the other hand, designers regularly use minimization programs when they are working with functions that have more than one output or more than five inputs. Some programs, such as those based on the Quine-McCluskey algorithm, find a true minimum by exhaustively checking all possibilities. Programs based on these exhaustive search algorithms can require long execution times, especially when dealing with large numbers of inputs. Other programs, such as the popular Espresso program developed at UC Berkeley, use heuristic (or rule-based) methods instead of exhaustive searches. Although these programs run much faster (especially on moderate to large systems), they terminate upon finding a "very good" solution that may not always be minimal. In many real-world engineering situations, finding a greatly minimized solution quickly is often the best approach.

The texture data is an image of say 64×64 pixel matrix stored at 8BPP. There are two ways to represent the digital information contained in the texture image.

a.) Creating a logic function to find the distribution of every unique color in the texture. This is done by finding all the unique colors in the texture and creating a binary map for the color for which distribution is to be found. The pixels occupied by the selected color in the texture are marked binary 1 and the rest are marked binary 0. This gives a map of minterms which are fed to the ESPRESSO program and minimized expression is obtained. All these minterms are used to regenerate the original texture image to test against error cases.

maintaining separate color palettes per block rather than per texture. b.) Smaller maps have a lower minimization efficiency.

For example, for church1.bmp image (64×64 8BPP and 21 unique colors) divided into 16 parts, we have:

| 12 | 11 | 14 | 9 |
| 13 | 15 | 19 | 16 |
| 19 | 16 | 17 | 17 |
| 15 | 16 | 17 | 13 |

Without making any changes to the algorithms discussed above, the compression ratio is not comparable to other texture compression algorithms like S3TC. However, it can be increased by doing a lossy compression by reducing the number of colors being used in the color palette. Note that

```
C1  C1
        C1  C1                      C1  C1
        C1  C1                      C1  C1
                C1  C1  C1  C1
                C1  C1  C1  C1                      C1
    C1                                      C1  C1  C1
C1  C1      C1              C1                  C1  C1
C1  C1  C1  C1          C1  C1
    C1  C1      C1  C1              C1
    C1  C1  C1  C1      C1      C1  C1                  C1
            C1  C1  C1  C1          C1  C1      C1  C1
            C1  C1  C1              C1  C1  C1  C1
                C1  C1                          C1  C1
                C1  C1                              C1
                            C1  C1
```

C1 is a unique color in this 16 × 16 pixel block of texture. This is replaced by "binary 1" and the rest are replaced by "binary 0" to find logic expression for distribution of C1 in the range.

b.) Creating a logic function to find the distribution of every bit of a pixel in RGB space. Since in an 8BPP image, 8 bits per pixel are needed to find the unique color. Since for a given texture, the 8-bit space is sparsely occupied by the colors in the texture, a mapping of textures' original color palette to a sequential one can help save some of the most significant bits out of 8-bits. For example, for a texture of 20 colors only 5 bits are required out of the 8-bits of RGB color space.

Textures can also be placed together to build a mosaic of textures. However, it turns out that as the number of unique colors in the mosaic is more than a single texture, the number of KMaps needed also increases. For method a.) above, as the number of colors increases, the number of Kmaps also increases, while for method b.) the number of bits required to index the color palette of the mosaic increases and causes overhead of additional Kmaps. Thus, the efficiency gained with a larger KMap by using a mosaic is largely offset by the increase in bits in the color palette.

It is also possible to subdivide the texture into small blocks. However, the efficiency of compression depends on the texture image i.e. if the number of bits in the color palette decreases largely due to decrease in number of colors in the sub-block. The costs associated with this are: a) Cost of reducing the color palette size has direct relationship with the number of maps being processed. This can be done in two ways:

1.) Replace the low frequency color pixels with other high frequency color pixels with similar or closer RGB values such that the final texture image is visually unaltered. This can be done till we get significantly lesser no. of colors to affect the compression like if we have 17 colors we could reduce 1 color or 9 colors, whichever doesn't alter the visual effect very much. As an example, for the church1.raw image, we have the following color frequency distribution:

```
index = 0,  color = 175,  Freq = 1
index = 1,  color =  18,  Freq = 2
index = 2,  color = 174,  Freq = 3
index = 3,  color = 173,  Freq = 11
index = 4,  color =  19,  Freq = 16
index = 5,  color =  20,  Freq = 18
index = 6,  color = 161,  Freq = 30
index = 7,  color = 116,  Freq = 30
index = 8,  color = 172,  Freq = 41
index = 9,  color =  22,  Freq = 41
index = 10, color = 171,  Freq = 51
index = 11, color =  21,  Freq = 55
index = 12, color = 170,  Freq = 105
```

-continued

| | |
|---|---|
| index = 13, color = | 162, Freq = 108 |
| index = 14, color = | 163, Freq = 276 |
| index = 15, color = | 169, Freq = 291 |
| index = 16, color = | 164, Freq = 333 |
| index = 17, color = | 168, Freq = 468 |
| index = 18, color = | 167, Freq = 699 |
| index = 19, color = | 165, Freq = 740 |
| index = 20, color = | 166, Freq = 777 |

Here, we can merge the low frequency colors with the high frequency colors. However, it seems that the color value (in<color=val>field) in this 8BPP image is actually an index to the 16 million color space stored in the header information of the .bmp image, and we need to match the colors in that space instead of 256 color space.

2.) Replace the closely related colors (irrespective of frequency of occurrence) in the RGB color space with a mid-way color value on the line-segment joining the two colors in the RGB space. Of course, the visual unalteredness criteria should be maintained.

Reference is now made to FIG. 22. APA is a minterms machine. Minterms of up to 16 variables may be run in one machine cycle for 512 values. Hence multi-parallelism of 16×512=8K processors of one bit may work concurrently.

Figure 23:
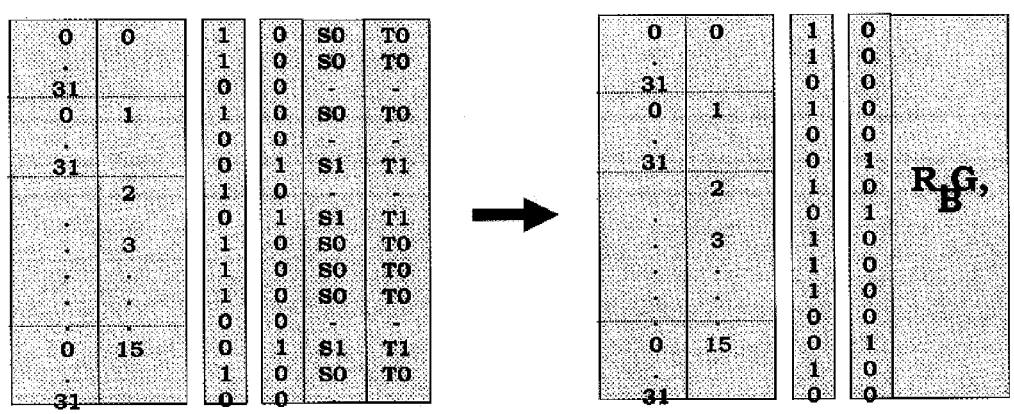
FIGS. 23 and 24 are simplified illustrations of RGB generation in accordance with an embodiment of the present invention.
Figure 24:
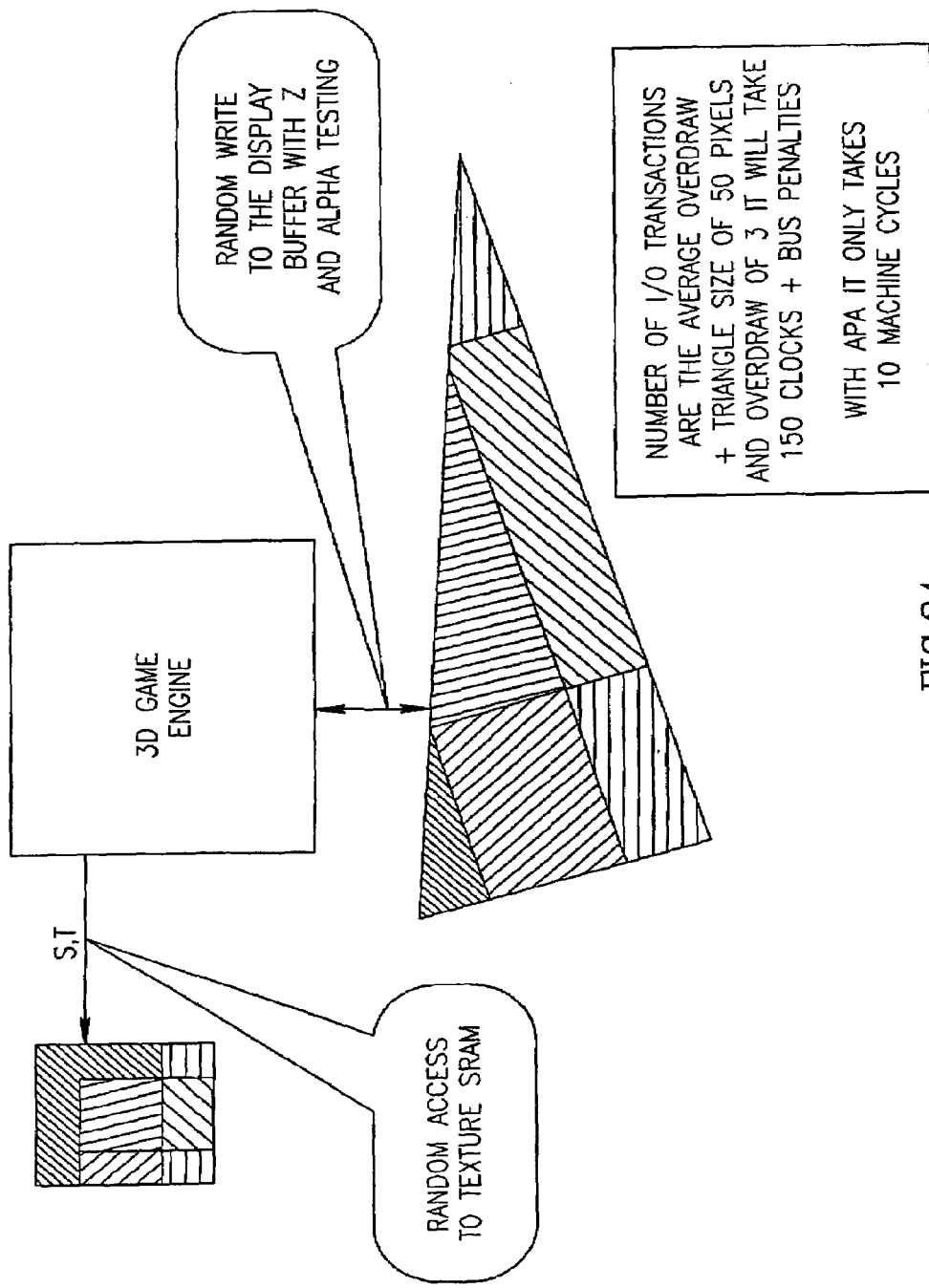

FIGS. 23 and 24 show an example of RGB generation. RGB may be generated by minterms. The APA computes in parallel the RGB vales by running the minterms on the S and T values. (S and T values are coordinates for the texture coordinate generation function.) In the prior art, generating the RGB values for a triangle size of 50 pixels and overdraw of 3 pixels may take 150 clocks plus bus penalties. In contrast, on the present invention, with APA it may take only 10 machine cycles.

As is known in the art, a minterm of k variables is a conjunction of k literals, where each variable shows up exactly once. A minterm produces a truth table that has exactly one 1 as output. (A literal is either a variable or its negation.)

The present invention may be used in applications for gaming devices. In addition, based on the teachings of the present invention gaming tools can be modified to generate a binary file for a selected target platform based on the present invention.

What is claimed is:

1. A method comprising:
converting a texture, which comprises a bitmap image used to apply a design onto the surface of a three-dimensional (3D) computer model for 3D graphics display, to APA (associative processor apparatus) instructions, wherein the APA computes tile coordinates, comprising X and Y coordinates which are coordinates of the processed tile that are actually seen on a display screen, the associative processing comprising inside and outside flags, wherein the inside flag indicates that the X and Y coordinates are inside the geometric shape and outside flag indicates that the X and Y coordinates are outside the geometric shape.

2. The method according to claim 1, further comprising converting values called alpha values, used to define blending effects of the 3D graphics display, to APA instructions.

3. The method according to claim 1, further comprising performing "over draw", comprising calculating relative depths of objects of the 3D graphics display for hidden rendering, with the APA.

4. The method according to claim 1, wherein converting the texture comprises dividing data associated with the texture into a geometry part comprising geometric shapes and a rendering part comprising pixels of data.

5. The method according to claim 4, comprising processing the geometry part and the rendering part with the APA on different display frames.

6. The method according to claim 4, wherein processing the geometry part comprises performing a geometry transformation, applying lighting to a display frame that includes the geometry part, and projecting and dividing the display frame into tiles, said tiles including coefficients that define geometric shapes within the tile, said coefficients being used for rendering by the APA.

7. The method according to claim 6, comprising rendering data associated with the tiles, wherein the APA computes final RGB (red-green-blue) values including alpha blending internally in the APA.

8. The method according to claim 7, comprising computing RGB values by means of minterms.

9. The method according to claim 7, further comprising outputting the RGB values to a display.

10. The method according to claim 1, wherein converting the texture comprises representing the texture by an address list that contains content features of the texture, and using the APA to process the content features.

11. The method according to claim 10, further comprising minimizing the address list.

12. The method according to claim 11, comprising minimizing the address list with a Karnaugh map.

13. A method comprising:
rendering a bitmap image used for a 3D graphics display with an APA (associative processor apparatus); and
creating tiles associated with the bitmap image, said tiles including coefficients that define geometric shapes within the tile, and computing tile coordinates, comprising X and Y coordinates which are coordinates of the processed tile that are actually seen on a display screen, wherein the APA creates inside and outside flags, wherein the inside flag indicates that the X and Y coordinates are inside the geometric shape and outside flag indicates that the X and Y coordinates are outside the geometric shape.

14. A method comprising:
rendering a bitmap image used for a 3D graphics display with an APA (associative processor apparatus); and
creating tiles associated with the bitmap image, and rendering data associated with the tiles, wherein the APA computes final RGB (red-green-blue) values internally in the APA.

15. The method according to claim 14, further comprising converting values called alpha values, used to define blending effects of the 3D graphics display, to APA instructions.

16. The method according to claim 14, further comprising performing "over draw", comprising calculating relative depths of objects of the 3D graphics display for hidden rendering, with the APA.

17. The method according to claim 14, wherein the APA computes RGB values by means of minterms.

18. The method according to claim 17, wherein the minterms are run on S and T values, which are coordinates for a texture coordinate generation function.

* * * * *